US012056821B2

United States Patent
Arora et al.

(10) Patent No.: US 12,056,821 B2
(45) Date of Patent: Aug. 6, 2024

(54) APPARATUS, METHOD, AND COMPUTER-READABLE MEDIUM FOR IMPLICIT REPRESENTATION OF TEXTURE ON 3D IMAGES

(71) Applicant: HUAWEI TECHNOLOGIES., LTD., Guangdong (CN)

(72) Inventors: Himanshu Arora, Burnaby (CA); Joshua John Horacsek, Maple Ridge (CA); Changqing Zou, Surrey (CA); Wallace Michel Pinto Lira, Coquitlam (CA)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/868,435

(22) Filed: Jul. 19, 2022

(65) Prior Publication Data
US 2024/0029357 A1    Jan. 25, 2024

(51) Int. Cl.
*G06T 17/20*    (2006.01)
*G06N 3/048*    (2023.01)
*G06T 15/04*    (2011.01)

(52) U.S. Cl.
CPC ............. *G06T 17/20* (2013.01); *G06N 3/048* (2023.01); *G06T 15/04* (2013.01)

(58) Field of Classification Search
CPC .......... G06T 17/20; G06T 15/04; G06N 3/048
See application file for complete search history.

(56) References Cited

U.S. PATENT DOCUMENTS

| | | | | |
|---|---|---|---|---|
| 11,335,056 | B1 * | 5/2022 | Takikawa | ................ G06T 15/08 |
| 2022/0165025 | A1 * | 5/2022 | Lambert | ................ G06T 17/20 |
| 2022/0327769 | A1 * | 10/2022 | Tsai | ...................... G06T 15/205 |

FOREIGN PATENT DOCUMENTS

CN    113 705 2958 A    * 11/2021    ............... G06K 9/00

* cited by examiner

*Primary Examiner* — Said Broome
*Assistant Examiner* — Donna J. Ricks
(74) *Attorney, Agent, or Firm* — Locke Lord LLP; Tim Tingkang Xia, Esq.

(57) ABSTRACT

An apparatus, method, and computer-readable medium for rendering a 3D image using a neural network for implicit representation of the image. UV coordinates of a texture map corresponding to a point on the image are calculated using a texture neural network. The image is rendered by applying a color value located at the UV coordinates of the texture map to the point.

11 Claims, 4 Drawing Sheets

APPARATUS, METHOD, AND COMPUTER-READABLE MEDIUM FOR IMPLICIT REPRESENTATION OF TEXTURE ON 3D IMAGES

FIELD OF THE DISCLOSURE

The present disclosure relates generally to methods, apparatuses, and computer-readable storage media for rendering 3D images using neural networks, and in particular to methods, apparatuses, and computer-readable storage media for implicit representation of texture on 3D images.

BACKGROUND

Neural networks may be used to implicitly represent the geometry of 3D images. These geometry neural networks use Signed Distance Fields (SDFs) to represent the geometry of the 3D images. SDFs are functions that categorize every 3D point around an image as inside, outside or on the surface. Examples of such neural networks include Deep-SDF, IMNet, SIREN, Neural LOD, and NDF. However, such geometry neural networks are not able to implicitly represent textures on 3D images using a neural network.

SUMMARY

Generally, according to some embodiments of the disclosure, there is provided a method for rendering a 3D image. More specifically, a method is described for rendering the texture of a 3D image using a neural network. Neural networks have been used to implicitly represent the geometry of 3D images. However, there are no neural networks that adequately represent the texture of 3D images.

In particular, according to one aspect of this disclosure, there is provided a method for rendering a 3D image that comprises calculating, using a texture neural network, UV coordinates of a texture map corresponding to a point on the image. The texture neural network performs UV parametrization. That is, it maps points from the 3D geometry of the image to UV coordinates on a texture map that contains the color values to be applied to the 3D geometry. The method may further comprise rendering the image by applying a color value located at the UV coordinates of the texture map to the point.

In some embodiments, the texture neural network may use the following activation function $f(x)=\alpha*ReLU(x+\beta/\alpha)$. ReLU is a Rectified Linear Unit activation function. This activation function enables the texture neural network to learn the UV parametrization even though the texture map contains discontinuities. In the activation function, $\alpha$ may initialized as one (1) and $\beta$ may be initialized as zero (0), and $\alpha$ and $\beta$ may be learnable by the texture neural network.

In some embodiments, the texture neural network may be trained by selecting a mesh triangle from a 3D mesh representation of the image; selecting a sampled point within the mesh triangle; calculating barycentric coordinates of the sampled point; calculating, using the barycentric coordinates, actual UV coordinates of the texture map corresponding to the sampled point; calculating, using the texture neural network, predicted UV coordinates of the texture map corresponding to the sampled point; calculating a loss function from the actual UV coordinates and the predicted UV coordinates; and training the texture neural network by minimizing the loss function. The texture neural network may use either an L1 or L2 loss function.

In some embodiments, the method may comprise rendering a shape or geometry of the image using a geometry neural network. The texture neural network may be used in conjunction with a geometry neural network to fully render or reconstruct a 3D image. The geometry neural network may render the geometry of the image, while the texture neural network may render the textures of the image.

In some embodiments rendering the image may comprise applying the color value from the texture map to the point on the shape.

In some embodiments, the texture neural network may be a signed distance field function.

In some embodiments, the image may be rendered using a different texture map to produce the image with a different texture, color, or level of detail.

In some embodiments, the texture map may contain discontinuities.

According to a further aspect of the disclosure, there is provided a non-transitory computer-readable medium comprising computer program code stored thereon for rendering a 3D image, wherein the code, when executed by one or more processors, causes the one or more processors to perform a method comprising: calculating, using a texture neural network, UV coordinates of a texture map corresponding to a point on the image; and rendering the image by applying a color value located at the UV coordinates of the texture map to the point.

The method may furthermore comprise performing any of the operations described above in connection with the first aspect of the disclosure.

According to a further aspect of the disclosure, there is provided a computing device comprising one or more processors operable to perform a method for rendering a 3D image, wherein the method comprises: calculating, using a texture neural network, UV coordinates of a texture map corresponding to a point on the image; and rendering the image by applying a color value located at the UV coordinates of the texture map to the point.

The one or more processors, which may be a graphics processor, may be operable to perform any of the operations described above in connection with the first aspect of the disclosure.

The above described methods, device, and non-transitory computer-readable storage medium provide a number of advantages. By providing a texture neural network that can be used in conjunction with a geometry neural network, implicit representations using neural networks may be used to render 3D images in real world applications. Using neural networks to render 3D images has a number of advantages over using a 3D mesh, such as a reduction in the amount of data needed to represent the image. Another advantage is that the texture neural network enables the use of different texture maps on the same shape without any reconfiguration of the texture neural network. This makes it easier to dynamically change properties of the 3D object. Another advantage is that the texture neural network enables the implementation of different levels of detail with the same texture neural network without reconfiguration. This can be useful to adjust the quality of the rendering depending on the computing resources available.

This summary does not necessarily describe the entire scope of all aspects. Other aspects, features, and advantages will be apparent to those of ordinary skill in the art upon review of the following description of specific embodiments.

BRIEF DESCRIPTION OF THE DRAWINGS

For a more complete understanding of the disclosure, reference is made to the following description and accompanying drawings, in which.

DETAILED DESCRIPTION

Embodiments disclosed herein relate to a graphics module or circuitry for executing a 3D rendering process.

As will be described later in more detail, a "module" is a term of explanation referring to a hardware structure such as a circuitry implemented using technologies such as electrical and/or optical technologies (and with more specific examples of semiconductors) for performing defined operations or processings. A "module" may alternatively refer to the combination of a hardware structure and a software structure, wherein the hardware structure may be implemented using technologies such as electrical and/or optical technologies (and with more specific examples of semiconductors) in a general manner for performing defined operations or processings according to the software structure in the form of a set of instructions stored in one or more non-transitory, computer-readable storage devices or media.

As will be described in more detail below, the graphics module may be a part of a device, an apparatus, a system, and/or the like, wherein the graphics module may be coupled to or integrated with other parts of the device, apparatus, or system such that the combination thereof forms the device, apparatus, or system. Alternatively, the graphics module may be implemented as a standalone device or apparatus.

The graphics module executes a 3D rendering process for rendering the geometry and texture of a 3D image. Herein, a process has a general meaning equivalent to that of a method, and does not necessarily correspond to the concept of computing process (which is the instance of a computer program being executed). More specifically, a process herein is a defined method implemented using hardware components for processing data (for example, 3D mesh data, and/or the like). A process may comprise or use one or more functions for processing data as designed. Herein, a function is a defined sub-process or sub-method for computing, calculating, or otherwise processing input data in a defined manner and generating or otherwise producing output data.

As those skilled in the art will appreciate, the 3D rendering process disclosed herein may be implemented as one or more software and/or firmware programs having necessary computer-executable code or instructions and stored in one or more non-transitory computer-readable storage devices or media which may be any volatile and/or non-volatile, non-removable or removable storage devices such as RAM, ROM, EEPROM, solid-state memory devices, hard disks, CDs, DVDs, flash memory devices, and/or the like. The graphics module may read the computer-executable code from the storage devices and execute the computer-executable code to perform the encryption and/or decryption processes.

Alternatively, the 3D rendering process disclosed herein may be implemented as one or more hardware structures having necessary electrical and/or optical components, circuits, logic gates, integrated circuit (IC) chips, and/or the like.

Figure 1:
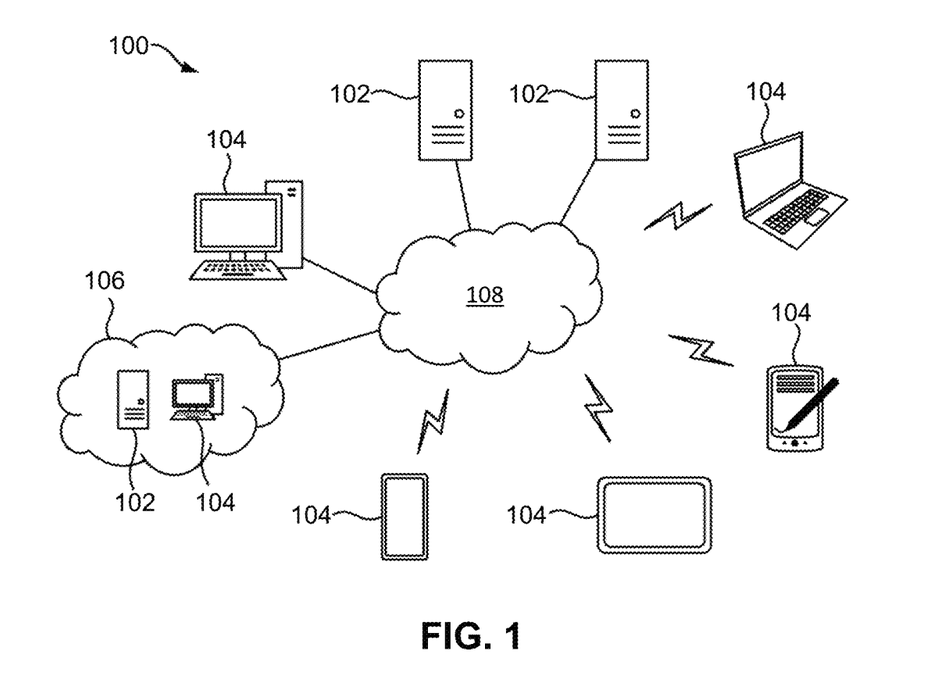
FIG. 1 is a schematic diagram of a computer network system for implicitly representing texture on 3D images, according to some embodiments of this disclosure.

Turning now to FIG. 1, a computer network system for implicitly representing texture on 3D images is shown and is generally identified using reference numeral 100. In these embodiments, the system 100 is configured for rendering 3D images.

As shown in FIG. 1, the system 100 comprises one or more server computers 102, a plurality of client computing devices 104, and one or more client computer systems 106 functionally interconnected by a network 108, such as the Internet, a local area network (LAN), a wide area network (WAN), a metropolitan area network (MAN), and/or the like, via suitable wired and wireless networking connections.

The server computers 102 may be computing devices designed specifically for use as a server, and/or general-purpose computing devices acting server computers while also being used by various users. Each server computer 102 may execute one or more server programs.

The client computing devices 104 may be portable and/or non-portable computing devices such as laptop computers, tablets, smartphones, Personal Digital Assistants (PDAs), desktop computers, and/or the like. Each client computing device 104 may execute one or more client application programs which sometimes may be called "apps".

Figure 2:
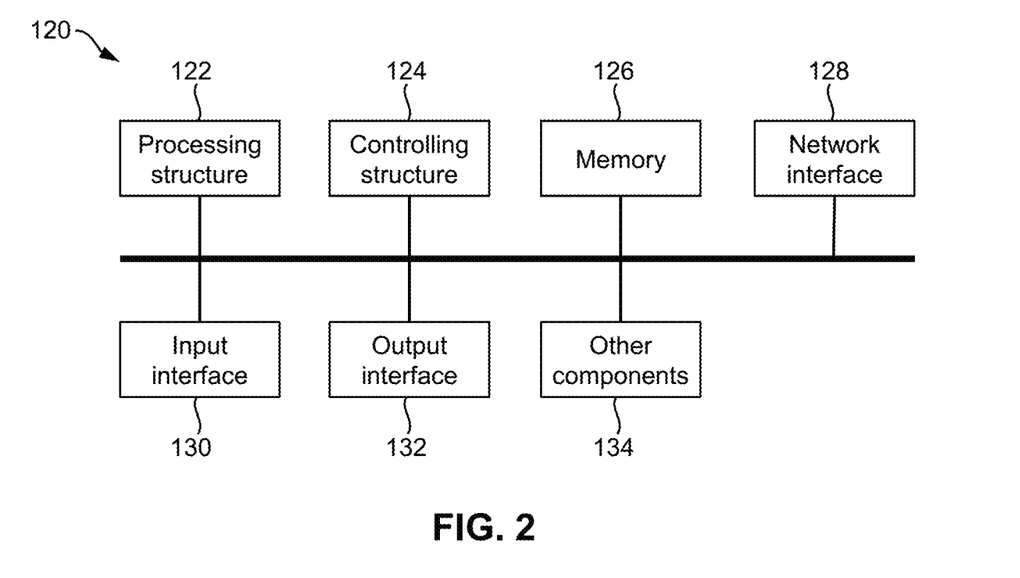
FIG. 2 is a schematic diagram showing a simplified hardware structure of a computing device of the computer network system shown in FIG. 1.

Generally, the computing devices 102 and 104 comprise similar hardware structures such as hardware structure 120 shown in FIG. 2. As shown, the hardware structure 120 comprises a processing structure 122, a controlling structure 124, one or more non-transitory computer-readable memory or storage devices 126, a network interface 128, an input interface 130, and an output interface 132, functionally interconnected by a system bus 138. The hardware structure 120 may also comprise other components 134 coupled to the system bus 138.

The processing structure 122 may be one or more single-core or multiple-core computing processors, generally referred to as central processing units (CPUs), such as INTEL® microprocessors (INTEL is a registered trademark of Intel Corp., Santa Clara, CA, USA), AMD® microprocessors (AMD is a registered trademark of Advanced Micro Devices Inc., Sunnyvale, CA, USA), ARM® microprocessors (ARM is a registered trademark of Arm Ltd., Cambridge, UK) manufactured by a variety of manufactures such as Qualcomm of San Diego, California, USA, under the ARM® architecture, or the like. When the processing structure 122 comprises a plurality of processors, the processors thereof may collaborate via a specialized circuit such as a specialized bus or via the system bus 138.

The processing structure 122 may also comprise one or more real-time processors, programmable logic controllers (PLCs), microcontroller units (MCUs), μ-controllers (UCs), specialized/customized processors, hardware accelerators, and/or controlling circuits (also denoted "controllers") using, for example, field-programmable gate array (FPGA) or application-specific integrated circuit (ASIC) technologies, and/or the like. In some embodiments, the processing structure includes a CPU (otherwise referred to as a host processor) and a specialized hardware accelerator which includes circuitry configured to perform computations of neural networks such as tensor multiplication, matrix multiplication, and the like. The host processor may offload some computations to the hardware accelerator to perform computation operations of the neural network. Examples of a hardware accelerator include a graphics processing unit (GPU), Neural Processing Unit (NPU), and Tensor Process Unit (TPU). In some embodiments, the host processors and the hardware accelerators (such as the GPUs, NPUs, and/or TPUs) may be generally considered processors.

Generally, the processing structure 122 comprises necessary circuitries implemented using technologies such as electrical and/or optical hardware components for executing an encryption process and/or a decryption process, as the design purpose and/or the use case maybe, for encrypting and/or decrypting data received from the input 106 and outputting the resulting encrypted or decrypted data through the output 108.

For example, the processing structure 122 may comprise logic gates implemented by semiconductors to perform various computations, calculations, and/or processings. Examples of logic gates include AND gate, OR gate, XOR (exclusive OR) gate, and NOT gate, each of which takes one or more inputs and generates or otherwise produces an output therefrom based on the logic implemented therein. For example, a NOT gate receives an input (for example, a high voltage, a state with electrical current, a state with an emitted light, or the like), inverts the input (for example, forming a low voltage, a state with no electrical current, a state with no light, or the like), and output the inverted input as the output.

While the inputs and outputs of the logic gates are generally physical signals and the logics or processings thereof are tangible operations with physical results (for example, outputs of physical signals), the inputs and outputs thereof are generally described using numerals (for example, numerals "0" and "1") and the operations thereof are generally described as "computing" (which is how the "computer" or "computing device" is named) or "calculation", or more generally, "processing", for generating or producing the outputs from the inputs thereof.

Sophisticated combinations of logic gates in the form of a circuitry of logic gates, such as the processing structure 122, may be formed using a plurality of AND, OR, XOR, and/or NOT gates. Such combinations of logic gates may be implemented using individual semiconductors, or more often be implemented as integrated circuits (ICs).

A circuitry of logic gates may be "hard-wired" circuitry which, once designed, may only perform the designed functions. In this example, the processes and functions thereof are "hard-coded" in the circuitry.

With the advance of technologies, it is often that a circuitry of logic gates such as the processing structure 122 may be alternatively designed in a general manner so that it may perform various processes and functions according to a set of "programmed" instructions implemented as firmware and/or software and stored in one or more non-transitory computer-readable storage devices or media. In this example, the circuitry of logic gates such as the processing structure 122 is usually of no use without meaningful firmware and/or software.

Of course, those skilled the art will appreciate that a process or a function (and thus the processor 102) may be implemented using other technologies such as analog technologies.

Referring back to FIG. 1, the controlling structure 124 comprises one or more controlling circuits, such as graphic controllers, input/output chipsets and the like, for coordinating operations of various hardware components and modules of the computing device 102/104.

The memory 126 comprises one or more storage devices or media accessible by the processing structure 122 and the controlling structure 124 for reading and/or storing instructions for the processing structure 122 to execute, and for reading and/or storing data, including input data and data generated by the processing structure 122 and the controlling structure 124. The memory 126 may be volatile and/or non-volatile, non-removable or removable memory such as RAM, ROM, EEPROM, solid-state memory, hard disks, CD, DVD, flash memory, or the like.

The network interface 128 comprises one or more network modules for connecting to other computing devices or networks through the network 108 by using suitable wired or wireless communication technologies such as Ethernet, WIFI® (WI-FI is a registered trademark of Wi-Fi Alliance, Austin, TX, USA), BLUETOOTH® (BLUETOOTH is a registered trademark of Bluetooth Sig Inc., Kirkland, WA, USA), Bluetooth Low Energy (BLE), Z-Wave, Long Range (LoRa), ZIGBEE® (ZIGBEE is a registered trademark of ZigBee Alliance Corp., San Ramon, CA, USA), wireless broadband communication technologies such as Global System for Mobile Communications (GSM), Code Division Multiple Access (CDMA), Universal Mobile Telecommunications System (UMTS), Worldwide Interoperability for Microwave Access (WiMAX), CDMA2000, Long Term Evolution (LTE), 3GPP, 5G New Radio (5G NR) and/or other 5G networks, and/or the like. In some embodiments, parallel ports, serial ports, USB connections, optical connections, or the like may also be used for connecting other computing devices or networks although they are usually considered as input/output interfaces for connecting input/output devices.

The input interface 130 comprises one or more input modules for one or more users to input data via, for example, touch-sensitive screen, touch-sensitive whiteboard, touch-pad, keyboards, computer mouse, trackball, microphone, scanners, cameras, and/or the like. The input interface 130 may be a physically integrated part of the computing device 102/104 (for example, the touch-pad of a laptop computer or the touch-sensitive screen of a tablet), or may be a device physically separate from, but functionally coupled to, other components of the computing device 102/104 (for example, a computer mouse). The input interface 130, in some implementation, may be integrated with a display output to form a touch-sensitive screen or touch-sensitive whiteboard.

The output interface 132 comprises one or more output modules for output data to a user. Examples of the output modules comprise displays (such as monitors, LCD displays, LED displays, projectors, and the like), speakers, printers, virtual reality (VR) headsets, augmented reality (AR) goggles, and/or the like. The output interface 132 may be a physically integrated part of the computing device 102/104 (for example, the display of a laptop computer or tablet), or may be a device physically separate from but functionally coupled to other components of the computing device 102/104 (for example, the monitor of a desktop computer).

The computing device 102/104 may also comprise other components 134 such as one or more positioning modules, temperature sensors, barometers, inertial measurement unit (IMU), and/or the like.

The system bus 138 interconnects various components 122 to 134 enabling them to transmit and receive data and control signals to and from each other.

Figure 3:
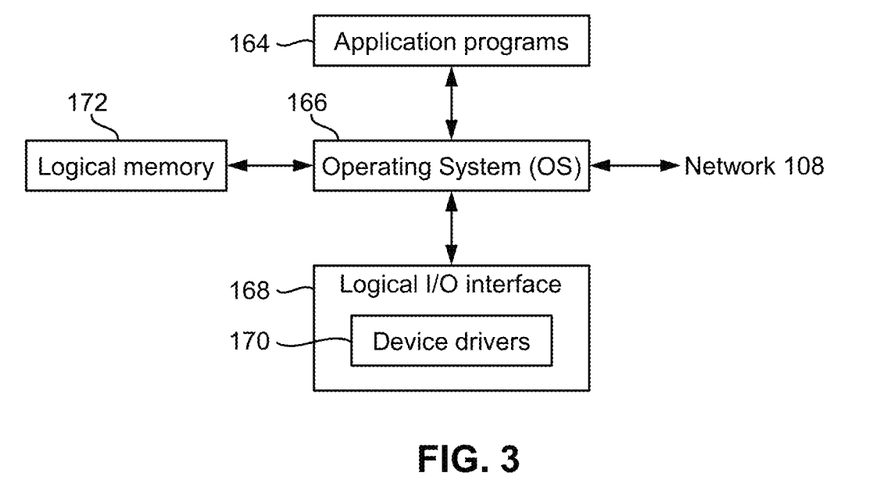
FIG. 3 is a schematic diagram showing a simplified software architecture of a computing device of the computer network system shown in FIG. 1.

FIG. 3 shows a simplified software architecture 160 of the computing device 102 or 104. The software architecture 160 comprises one or more application programs 164, an operating system 166, a logical input/output (I/O) interface 168, and a logical memory 172. The one or more application programs 164, operating system 166, and logical I/O interface 168 are generally implemented as computer-executable instructions or code in the form of software programs or firmware programs stored in the logical memory 172 which may be executed by the processing structure 122.

The one or more application programs 164 executed by or run by the processing structure 122 for performing various tasks.

The operating system 166 manages various hardware components of the computing device 102 or 104 via the logical I/O interface 168, manages the logical memory 172, and manages and supports the application programs 164. The operating system 166 is also in communication with other computing devices (not shown) via the network 108 to allow application programs 164 to communicate with those running on other computing devices. As those skilled in the art will appreciate, the operating system 166 may be any suitable operating system such as MICROSOFT® WINDOWS® (MICROSOFT and WINDOWS are registered trademarks of the Microsoft Corp., Redmond, WA, USA), APPLE® OS X, APPLE® iOS (APPLE is a registered trademark of Apple Inc., Cupertino, CA, USA), Linux, ANDROID® (ANDROID is a registered trademark of Google LLC, Mountain View, CA, USA), or the like. The computing devices 102 and 104 of the image-sanitization system 100 may all have the same operating system, or may have different operating systems.

The logical I/O interface 168 comprises one or more device drivers 170 for communicating with respective input and output interfaces 130 and 132 for receiving data therefrom and sending data thereto. Received data may be sent to the one or more application programs 164 for being processed by one or more application programs 164. Data generated by the application programs 164 may be sent to the logical I/O interface 168 for outputting to various output devices (via the output interface 132).

The logical memory 172 is a logical mapping of the physical memory 126 for facilitating the application programs 164 to access. In this embodiment, the logical memory 172 comprises a storage memory area that may be mapped to a non-volatile physical memory such as hard disks, solid-state disks, flash drives, and the like, generally for long-term data storage therein. The logical memory 172 also comprises a working memory area that is generally mapped to high-speed, and in some implementations volatile, physical memory such as RAM, generally for application programs 164 to temporarily store data during program execution. For example, an application program 164 may load data from the storage memory area into the working memory area, and may store data generated during its execution into the working memory area. The application program 164 may also store some data into the storage memory area as required or in response to a user's command.

In a server computer 102, the one or more application programs 164 generally provide server functions for managing network communication with client computing devices 104 and facilitating collaboration between the server computer 102 and the client computing devices 104. Herein, the term "server" may refer to a server computer 102 from a hardware point of view or a logical server from a software point of view, depending on the context.

As described above, the processing structure 122 is usually of no use without meaningful firmware and/or software. Similarly, while a computer system such as the system 100 may have the potential to perform various tasks, it cannot perform any tasks and is of no use without meaningful firmware and/or software. As will be described in more detail later, the system 100 described herein and the modules, circuitries, and components thereof, as a combination of hardware and software, generally produces tangible results tied to the physical world, wherein the tangible results such as those described herein may lead to improvements to the computer devices and systems themselves, the modules, circuitries, and components thereof, and/or the like.

The following embodiments may all be implemented on an electronic device (for example, computing device 102/104) with the foregoing hardware structure.

Figure 5:
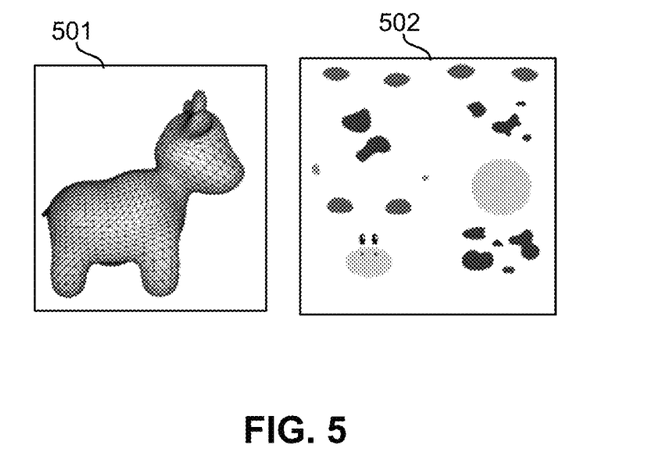
FIG. 5 is an example of a 3D mesh and a texture map.

Reference is now made to FIG. 5, which shows an example of a 3D mesh 501 and a texture map 502. A 3D mesh 501 may be defined using thousands of triangles which are used to represent the surface of an image. The 3D mesh may be stored in a data file. To represent texture for each of the triangles in the 3D mesh 501, there is a corresponding triangle in the texture map 502. A texture map 502 may be a 2D image. The mapping from triangles on the 3D mesh 501 to triangles on the texture map 502 is known as UV parametrization. The UV parametrization may be included in the 3D mesh data file. The object of the present invention is to use a texture neural network to perform UV parametrization without the need for the 3D mesh 501. That is, the texture neural network is able to map points on the 3D geometry generated by a geometry neural network to corresponding points on the texture map 502 so that the texture of the 3D image may be reconstructed. A geometry neural network in combination with the texture neural network of the present invention may reconstruct the geometry and texture of the 3D image without the 3D mesh 501.

Figure 6:
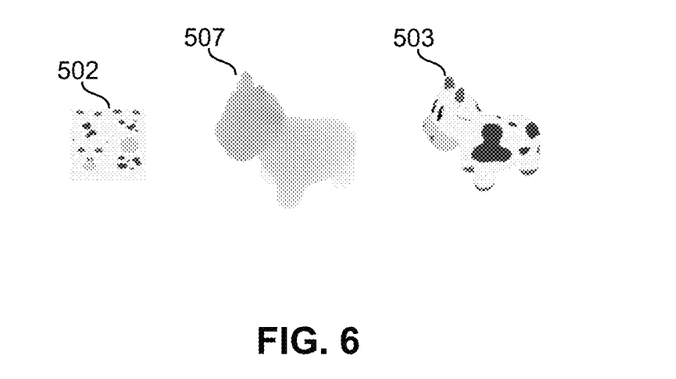
FIG. 6 is an example of a texture map, a 3D geometry, and a rendered image.

Reference is now made to FIG. 6, which shows the texture map 502, the reconstructed geometry 507, and the reconstructed 3D image 503. The reconstructed geometry 507 is generated by a geometry neural network. Any standard geometry neural network may be used for this step, for example, DeepSDF, IMNet, SIREN, Neural LOD, and NDF. The reconstructed image 503 is rendered using the texture neural network by mapping and applying the color values from the texture map 502 to the corresponding points on the 3D geometry 507.

Figure 4:
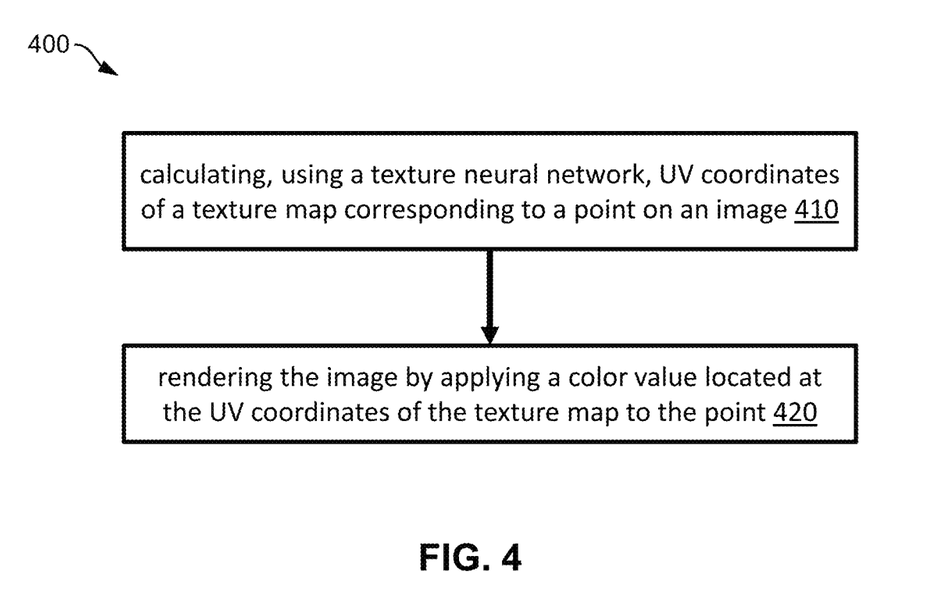
FIG. 4 is a flow diagram of a method for implicitly representing texture on 3D images, according to some embodiments of this disclosure.

Reference is now made to FIG. 4, which shows a method 400 for rendering a 3D image. The method 400 comprises calculating, using a texture neural network, UV coordinates of a texture map corresponding to a point on the image 410. The texture neural network may take as input the 3D coordinates (x, y, z) corresponding to a point on the reconstructed geometry of the image 507. The texture neural network may calculate as output the UV coordinates (u, v) on the texture map 502 that correspond to the point (x, y, z). The color value or texture at coordinates (u, v) of the texture map 502 is the color value that should be applied to the point (x, y, z) on the 3D geometry 507. The method 400 further comprises rendering the image by applying the color value located at the UV coordinates (u, v) of the texture map 502 to the point (x, y, z) on the reconstructed geometry of the image 507. Rendering the texture of the image may comprise sampling points from the 3D geometry 507, calculating the corresponding UV coordinates on the texture map 502 using the texture neural network, and applying the color value from the texture map to the geometry 507. The reconstructed image 503 shows an example of the result of this method.

Using a neural network to learn UV mapping is a challenging task because of the piece-wise parameterizations of the surface of the 3D image. These piece-wise parameterizations create discontinuities around edges of UV islands and thus make the parametrization difficult to learn by a neural network. This is in part why neural networks in the prior art have not been able to perform UV parametrization for complex 3D images. It has surprisingly been found that a novel activation function for the texture neural network is able to handle these discontinuities. The novel activation function is a shifted and parametric variant of a Rectified Linear Unit activation function (ReLU). This novel activation function may be referred to as "SReLU" and is defined as follows:

$$f(x) = \alpha * ReLU\left(x + \frac{\beta}{\alpha}\right)$$

The parameters α and β are both learnable and provide a parametric version of ReLU where the β parameter controls the shift. In particular, it has been found that adding β significantly improves the performance of the activation function. The parameters α and β are initialized as one (1) and zero (0) respectively. Further, they may be trained while learning the texture mapping. SReLU is sub-differentiable. It is differentiable everywhere except x=0. It has been found that using SReLU instead of traditional activation functions, such as ReLU significantly improves the results of the texture neural network. The reconstructed image 503 is better quality and does not contain discontinuities in the texture.

Figure 7:
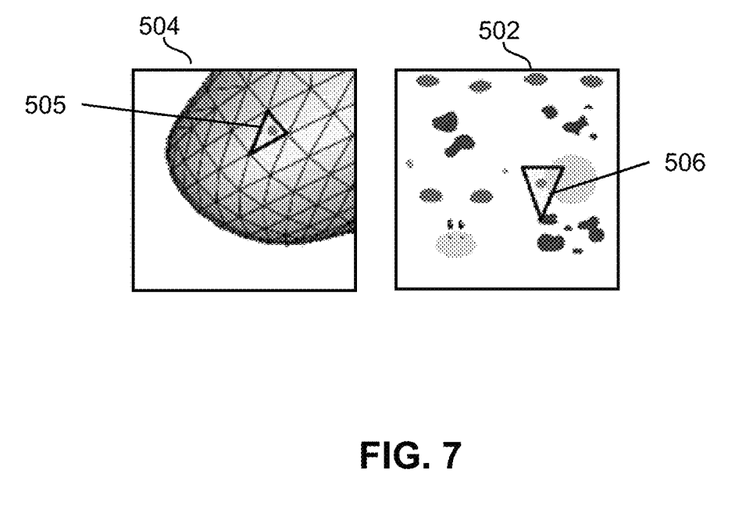
FIG. 7 is an example of a 3D mesh and a texture map.

Reference is now made to FIG. 7, which shows a part of a 3D mesh 504 and a texture map 502. The method 400 may further comprise selecting a mesh triangle 505 from a 3D mesh representation 504 of the image. The mesh triangle 505 may be randomly selected. The mesh triangle 505 may be selected in an area-weighted manner, such that the more area the mesh triangle 505 occupies, the more likely it is to be selected. The method 400 may further comprise selecting a sampled point within the mesh triangle 505. The sampled point may be selected randomly. The method 400 may further comprise calculating barycentric coordinates of the sampled point. Using the vertices of the mesh triangle, the barycentric coordinates of the sampled point may be calculated. Other methods may be used for calculating the coordinates of the sampled point. The method 400 may further comprise calculating, using the barycentric coordinates, actual UV coordinates of the texture map corresponding to the sampled point. The data for the 3D mesh 504 may comprise the UV coordinates for the vertices of the mesh triangle 505. Using the UV coordinates for the vertices of the mesh triangle 505 and the barycentric coordinates for the sampled point, the UV coordinates for the sampled point may be calculated. The method 400 may further comprise calculating, using the texture neural network, predicted UV coordinates of the texture map corresponding to the sampled point. The texture neural network may be trained to map coordinates in the 3D mesh 504 to UV coordinates in the texture map 502. The coordinates of the sampled point in the 3D mesh 504 are provided as input to the texture neural network, which predicts the UV coordinates in the texture map 502 corresponding to the sampled point. The method 400 may further comprise calculating a loss function from the actual UV coordinates and the predicted UV coordinates. Having calculated the actual UV coordinates of the sampled point in the texture map 502 using the barycentric coordinates of the sampled point, we can compare these actual UV coordinates to the UV coordinates predicted by the texture neural network using a loss function. The method 400 may further comprise training the texture neural network by minimizing this loss function. Using standard neural network training methods, the neural network may be trained to accurately predict the UV coordinates of a sampled point by minimizing the loss function, that is the difference between the actual and predicted UV coordinates.

The texture neural network may use an L1 or L2 loss function. An example of an L1 loss function is Σ|actual−predicted|. An L1 loss function is the sum of the absolute values of the error values. An example of an L2 loss function is Σ(actual−predicted)². An L2 loss function is the sum of the squares of the error values. Other loss functions may be used as well.

The method 400 may further comprise rendering a shape or geometry of the image using a geometry neural network 508. The texture neural network may be used in conjunction with a geometry neural network. Any geometry neural network may be used. The geometry neural network in conjunction with the texture neural network may form a pipeline for rendering a 3D image 503. The geometry neural network first renders the geometry or shape of the 3D image 507. The method 400 may further comprise rendering the image by applying the color value to the point on the shape. The texture neural network may calculate the UV coordinates for the sampled points on the geometry 507, and apply the color values from the texture map 502 to render the 3D image 503. The reconstructed image 503 has both 3D geometry and texture.

The texture neural network may be a signed distance field function (SDFs). SDFs are functions that categorize every 3D point around a shape as inside, outside or on the surface. The texture neural network provides a color value for each point on the surface of the 3D image.

One advantage of the present solution is that different texture maps 502 may be used with the same texture neural network. The method 400 may comprise rendering the image using a different texture map 502 to produce the image with a different texture, color, or level of detail. This may be used to provide different levels of detail, for example due to memory constraints. Furthermore, different texture maps may be used to change properties of objects. No change to the texture neural network is required to achieve these results as long as the texture maps 502 have the same UV coordinates.

As already noted, texture maps 502 often contain discontinuities. This makes it difficult for standard neural networks to learn the UV parametrization. The novel activation function SReLU of the present invention enables learning UV parametrization even when the texture maps 502 contain discontinuities. Other activation functions may be used by the texture neural network.

The 3D image may be rendered using the texture neural network either locally on the client computing device 104 or remotely on the server computer 102. If the 3D image is rendered remotely on the server computer 102, the client computing device 104 may send a request to render the image to the server computer 102 over the network 108. The server computer 102 may render the 3D image using the texture neural network. The server computer 102 may then send the rendered image over the network 108 to the client computing device 104 for display.

Although embodiments have been described above with reference to the accompanying drawings, those of skill in the art will appreciate that variations and modifications may be made without departing from the scope thereof as defined by the appended claims.

What is claimed is:

1. A method for rendering a 3D image, comprising:
   calculating, using a texture neural network, UV coordinates of a texture map corresponding to a point on the image, wherein an activation function of the texture neural network is $f(x)=\alpha*\text{ReLU}(x+\beta/\alpha)$, and ReLU is a Rectified Linear Unit activation function; and
   rendering the image by applying a color value located at the UV coordinates of the texture map to the point.

2. The method of claim 1, wherein $\alpha$ is initialized as 1 and $\beta$ is initialized as 0, and $\alpha$ and $\beta$ are learnable by the texture neural network.

3. The method of claim 1, further comprising:
   selecting a mesh triangle from a 3D mesh representation of the image;
   selecting a sampled point within the mesh triangle;
   calculating barycentric coordinates of the sampled point;
   calculating, using the barycentric coordinates, actual UV coordinates of the texture map corresponding to the sampled point;
   calculating, using the texture neural network, predicted UV coordinates of the texture map corresponding to the sampled point;
   calculating a loss function from the actual UV coordinates and the predicted UV coordinates; and
   training the texture neural network by minimizing the loss function.

4. The method of claim 3, wherein the loss function is an L1 loss function or an L2 loss function.

5. The method of claim 1, further comprising rendering a shape of the image using a geometry neural network.

6. The method of claim 5, wherein rendering the image comprises applying the color value to the point on the shape.

7. The method of claim 1, wherein the texture neural network is a signed distance field function.

8. The method of claim 1, further comprising rendering the image using a different texture map to produce the image with a different texture, color, or level of detail.

9. The method of claim 1, wherein the texture map contains discontinuities.

10. A non-transitory computer-readable medium comprising computer program code stored thereon for rendering a 3D image, wherein the code, when executed by one or more processors, causes the one or more processors to perform a method comprising:
    calculating, using a texture neural network, UV coordinates of a texture map corresponding to a point on the image, wherein an activation function of the texture neural network is $f(x)=\alpha*\text{ReLU}(x+\beta/\alpha)$, and ReLU is a Rectified Linear Unit activation function; and
    rendering the image by applying a color value located at the UV coordinates of the texture map to the point.

11. A computing device comprising:
    one or more processors; and
    memory storing computer program code, which when executed by the one or more processors, causes the computing device to perform a method for rendering a 3D image, the method comprising:
      calculating, using a texture neural network, UV coordinates of a texture map corresponding to a point on the image, wherein an activation function of the texture neural network is $f(x)=\alpha*\text{ReLU}(x+\beta/\alpha)$, and ReLU is a Rectified Linear Unit activation function; and
      rendering the image by applying a color value located at the UV coordinates of the texture map to the point.

* * * * *